United States Patent
Takeo et al.

(10) Patent No.: US 10,294,310 B2
(45) Date of Patent: May 21, 2019

(54) PHOTOCURABLE COMPOSITION

(71) Applicant: THREE BOND CO., LTD., Hachioji-shi, Tokyo (JP)

(72) Inventors: Yuko Takeo, Hachioji (JP); Naoya Otsuki, Hachioji (JP)

(73) Assignee: THREE BOND CO., LTD., Hachioji-Shi, Tokyo (JP)

(*) Notice: Subject to any disclaimer, the term of this patent is extended or adjusted under 35 U.S.C. 154(b) by 0 days.

(21) Appl. No.: 15/545,007

(22) PCT Filed: Jan. 21, 2016

(86) PCT No.: PCT/JP2016/051646
§ 371 (c)(1),
(2) Date: Jul. 20, 2017

(87) PCT Pub. No.: WO2016/117631
PCT Pub. Date: Jul. 28, 2016

(65) Prior Publication Data
US 2018/0022838 A1 Jan. 25, 2018

(30) Foreign Application Priority Data

Jan. 21, 2015 (JP) ................. 2015-009606

(51) Int. Cl.
| | | |
|---|---|---|
| C08F 2/46 | (2006.01) | |
| C08F 2/50 | (2006.01) | |
| C08G 61/04 | (2006.01) | |
| C09D 4/00 | (2006.01) | |
| C09K 3/10 | (2006.01) | |
| C08F 290/06 | (2006.01) | |
| C09D 7/40 | (2018.01) | |
| C08K 5/49 | (2006.01) | |

(52) U.S. Cl.
CPC ............ *C08F 2/50* (2013.01); *C08F 290/067* (2013.01); *C08K 5/49* (2013.01); *C09D 4/00* (2013.01); *C09D 7/40* (2018.01); *C09K 3/10* (2013.01); *C09K 3/1006* (2013.01)

(58) Field of Classification Search
CPC ............................ C08K 5/1545; C08K 5/375
USPC ................ 522/31, 6, 71, 189, 184, 1; 520/1
See application file for complete search history.

(56) References Cited

U.S. PATENT DOCUMENTS

| | | |
|---|---|---|
| 6,211,260 B1 | 4/2001 | Nakamura et al. |
| 6,486,225 B1 | 11/2002 | Kamata et al. |
| 2017/0030394 A1 | 2/2017 | Zimmerman et al. |

FOREIGN PATENT DOCUMENTS

| | | |
|---|---|---|
| EP | 3122529 A1 | 2/2017 |
| JP | H11-060962 A | 3/1999 |
| JP | H11-236517 A | 8/1999 |
| JP | 2000-212234 A | 8/2000 |
| JP | 2010-126630 A | 6/2010 |
| JP | 2010-225909 A | 10/2010 |
| JP | 2012-167262 * | 9/2012 |
| JP | 2012-167262 A | 9/2012 |
| JP | 2013-082924 A | 5/2013 |
| JP | 2013-194156 A | 9/2013 |
| JP | 2013-241580 A | 12/2013 |
| JP | 2014-025021 A | 2/2014 |
| JP | 2014-114386 A | 6/2014 |
| WO | WO 2012/090298 A1 | 7/2012 |
| WO | 2015148613 A1 | 10/2015 |
| WO | WO 2016/051914 A1 | 4/2016 |
| WO | WO 2017/023834 A1 | 2/2017 |

OTHER PUBLICATIONS

Nakayama et al, JP 2012-167262 Machine Translation Part 1, Sep. 6, 2012 (Year: 2012).*
Nakayama et al, JP 2012-167262 Machine Translation Part 2, Sep. 6, 2012 (Year: 2012).*
EESR in related EP 16740238.7 issued Dec. 21, 2017.
International Search Report and Written Opinion dated May 17, 2016 which issued in PCT Application No. PCT/JP2016/051646.
International Preliminary Report on Patentability dated Jul. 25, 2017 which issued in PCT Application No. PCT/JP2016/051646, including English translation.

* cited by examiner

*Primary Examiner* — Jessica Whiteley
(74) *Attorney, Agent, or Firm* — Dickinson Wright PLLC

(57) ABSTRACT

An object of the present invention is to provide a photocurable composition from which a cured product having high concealing property is obtained by irradiation with an active energy ray such as ultraviolet ray, and which inhibits color fading of the cured product in a high temperature and high humidity (85 C and 85% RH) environment or a high temperature (100 C) environment.

A photocurable composition including the following components (A) to (D):
  component (A): a leuco dye;
  component (B): a salt having an anion selected from the group consisting of $[P(Rf)_aF_{6-a}]^-$, $[Sb(Rf)_bF_{6-b}]^-$ and $[B(Rf)_cF_{4-c}]^-$ (in the formulae, Rf represents a fluoroalkyl group having 1 to 20 carbon atoms, a and b each independently represent an integer of from 1 to 5, and c represents an integer of from 1 to 3);
  component (C): a radical polymerizable compound; and
  component (D): a photoradical initiator.

13 Claims, No Drawings

PHOTOCURABLE COMPOSITION

TECHNICAL FIELD

The present invention relates to a photocurable composition from which a cured product having high concealing property is obtained by irradiation with an active energy ray such as ultraviolet ray, and which inhibits color fading of the cured product in a high temperature and high humidity (85 C and 85% RH) environment or a high temperature (100 C) environment.

BACKGROUND ART

Conventionally, a photocurable composition having high concealing property has been widely used in a coating material for a flexible wiring board (see Patent Literature 1), a casting material for a replica of a prototype model (see Patent Literature 2), a black stripe of lenticular lens (see Patent Literature 3), an adhesive agent for assembling an electronic equipment and the like (see Patent Literature 4), a sealing agent for a liquid crystal display (see Patent Literature 5), or the like. As a typical technique of imparting concealing property to a photocurable composition, mixing of carbon black of pigment can be mentioned. However, concealing property can be obtained, but most of active energy rays such as UV rays are absorbed into the carbon black, therefore, there has been a problem of causing poor curability when the concentration of the pigment is extremely high.

Under these circumstances, in Patent Literature 2, there is a disclosure of a photosensitive composition for casting, which contains a photoradical polymerization initiator, a leuco dye, a photoacid generator, and an ethylenically unsaturated compound, and the cured product has excellent photocurability while being black. This utilizes the fact that the generation speed of the "radical species generated by light irradiation" is faster than the generation speed of the "acid generated by light irradiation". That is, the photosensitive resin composition is cured by the transmission of light to the extent of the deep portion before being blackened with an acid.

CITATION LISTS

Patent Literature

Patent Literature 1: JP 2013-194156 A
Patent Literature 2: JP H11-060962 A
Patent Literature 3: JP 2013-082924 A
Patent Literature 4: JP 2014-025021 A
Patent Literature 5: JP 2010-126630 A

SUMMARY OF INVENTION

However, since the black-colored cured product of a photosensitive composition for casting disclosed in Patent Literature 2 exhibits a deteriorated concealing property due to color fading, which occurs when the cured product is left in a high temperature and high humidity (85 C and 85% RH) environment or a high temperature (100 C) environment, there have been problems in terms of use for various applications.

To solve the aforementioned problems of the related art, the inventors of the present invention studied a photocurable composition. As a result, they found that the main cause of occurrence of color fading of a cured product is based on detachment of an acid from a leuco dye in a high temperature and high humidity (85 C and 85% RH) environment or a high temperature (100 C) environment, and completed the present invention accordingly.

The present invention is devised in consideration of the circumstances described above, and an object of the invention is to provide a photocurable composition from which a cured product having high concealing property is obtained by irradiation with an active energy ray such as ultraviolet ray, and which inhibits color fading of the cured product in a high temperature and high humidity environment or a high temperature environment.

The present invention is to deal with the aforementioned problems of the related art. Namely, the gist of the present invention is as follows.

A photocurable composition including the following components (A) to (D):
  component (A): a leuco dye;
  component (B): a salt having an anion selected from the group consisting of $[P(Rf)_aF_{6-a}]^-$, $[Sb(Rf)_bF_{6-b}]^-$ and $[B(Rf)_cF_{4-c}]^-$ (in the formulae, Rf represents a fluoroalkyl group having 1 to 20 carbon atoms, a and b each independently represent an integer of from 1 to 5, and c represents an integer of from 1 to 3);
  component (C): a radical polymerizable compound; and
  component (D): a photoradical initiator.

DESCRIPTION OF EMBODIMENTS

One embodiment of the present invention relates to a photocurable composition containing component (A): a leuco dye, component (B): a salt having an anion selected from the group consisting of $[P(Rf)_aF_{6-a}]^-$, $[Sb(Rf)_bF_{6-b}]^-$ and $[B(Rf)_cF_{4-c}]^-$ (in the formulae, Rf represents a fluoroalkyl group having 1 to 20 carbon atoms, a and b each independently represent an integer of from 1 to 5, and c represents an integer of from 1 to 3), component (C): a radical polymerizable compound, and component (D): a photoradical initiator.

A cured product formed of the photocurable composition having such constitution has not only an excellent concealing property but also well-inhibited color fading in a high temperature and high humidity (85 C and 85% RH) environment or a high temperature (100 C) environment.

Hereinbelow, the photocurable composition according to the present invention (hereinbelow, also simply referred to as a "composition") and a cured product formed of the composition will be described in detail.

Furthermore, in the present specification, "X to Y" is used to have a meaning which includes the numerical values described before and after them (X and Y) as a lower limit value and an upper limit value, respectively. Further, unless otherwise specifically noted, operations and measurements of properties and the like are performed under the conditions of room temperature (20 to 25 C)/relative humidity 40 to 50% RH. In addition, the term "(meth)acrylate" includes both of "acrylate" or "methacrylate".

<Component (A)>

A leuco dye that is a component (A) of the present invention is a compound developing color by coming into contact with an acid, and can give concealing property to a cured product. Further, the leuco dye can make the color black, blue, green, red, or the like depending on the type, but from the viewpoint of being excellent in concealing property, a leuco dye capable of developing a black color is preferred.

Examples of the component (A) include, although not particularly limited, 3-dibutylamino-6-methyl-7-anilinofluoran, 3-dipropylamino-6-methyl-7-anilinofluoran, 3-diethylamino-6-methyl-7-anilinofluoran, 3-dimethylamino-6-methyl-7-anilinofluoran, 3-diethylamino-6-methyl-7-xylidinofluorane, and 3-(4-diethylamino-2-ethoxyphenyl)-3-(1-ethyl-2-methylind ole-3-yl)-4-azaphthalide. These can be used singly or by mixing two or more kinds thereof. Among them, from the viewpoint of concealing property of the cured product, 3-dibutylamino-6-methyl-7-anilinofluoran, and 3-diethylamino-6-methyl-7-anilinofluoran, are preferred. The product available on the market of the component (A) is not particularly limited, but examples of the product include S-205, BLACK305, ETAC, BLACK100, and NIR BLACK78 (manufactured by YAMADA CHEMICAL CO., LTD.), and ODB, ODB-2, ODB-4, ODB-250, and Black-XV (manufactured by Yamamoto Chemicals, Inc.).

The mixing amount of the component (A) of the present invention is, based on 100 parts by mass of the component (C) described later, preferably in the range of 0.01 to 20 parts by mass, more preferably 0.05 to 10 parts by mass, even more preferably 0.2 to 5 parts by mass, and particularly preferably 0.5 to 2 parts by mass. When the component (A) is 0.01 parts by mass or more, the cured product can have an excellent concealing property. Further, when the component (A) is 20 parts by mass or less, the composition can have excellent photocurability.

<Component (B)>

The component (B) is a compound which generates an acid such as a Lewis acid and a Broensted acid by irradiation with an active energy ray (that is, photoacid generator), and with the generated acid, it becomes possible to have color exhibition of a leuco dye. Furthermore, by selecting the component (B) of the present invention among photoacid generators and combining it with other components of the present invention, the effect of inhibiting color fading of a cured product in a high temperature and high humidity environment or a high temperature environment can be obtained. Although the reason for having enhanced fading resistance of a cured product by the component (B) of the present invention remains unclear, it is expected that, with regard to a salt having a specific anion with large volume structure ($P^+X^-$) such as the component (B) of the present invention, when an acid ($H^+X^-$) is generated from the salt, the mobility of the acid is lowered due to large volume of the counter anion, and the acid is hardly detached from the component (A). Therefore, color fading unlikely occur in the cured product. Furthermore, from the viewpoint of having excellent concealing property and photocurability at the same time, the component (B) is preferably a salt which has absorption in a wavelength range of 365 nm or higher.

The component (B) according to the composition of the present invention is a salt having an anion selected from the group consisting of $[P(Rf)_aF_{6-a}]^-$, $[Sb(Rf)_bF_{6-b}]^-$ and $[B(Rf)_cF_{4-c}]^-$ (in the formulae, Rf represents a fluoroalkyl group having 1 to 20 carbon atoms, a and b each independently represent an integer of from 1 to 5, and c represents an integer of from 1 to 3). In particular, from the viewpoint of having an excellent concealing property of a cured product, the component (B) of the present invention is preferably a salt which has an anion represented by $[P(Rf)_aF_{6-a}]^-$. The component (B) may be used either singly or in combination of two or more kinds thereof.

Rf represents an alkyl group having 1 to 20 carbon atoms in which part or all of the hydrogen atoms are substituted with a fluorine atom, and preferably represents an alkyl group having 1 to 20 carbon atoms in which all of the hydrogen atoms are substituted with a fluorine atom, that is, a perfluoroalkyl group. The alkyl group of Rf is preferably those having 1 to 12 carbon atoms, more preferably those having 1 to 8 carbon atoms, and even more preferably those having 1 to 4 carbon atoms. Specific examples of Rf include, although not particularly limited, $CF_3$, $CF_3CF_2$, $(CF_3)_2C$, $CF_3CF_2CF_2$, $CF_3CF_2CF_2CF_2$, and $(CF_3)_3C$. Among them, from the viewpoint of easy obtainability of a raw material, $CF_3CF_2$ (perfluoroethyl group) is preferable.

Examples of the alkyl group having 1 to 20 carbon atoms include a methyl group, an ethyl group, a n-propyl group, an isopropyl group, a cyclopropyl group, a n-butyl group, an isobutyl group, a sec-butyl group, a tert-butyl group, a cyclobutyl group, a n-pentyl group, an isopentyl group, a neopentyl group, a 1,2-dimethylpropyl group, a cyclopentyl group, a n-hexyl group, a cyclohexyl group, a 1,3-dimethylbutyl group, a 1-isopropylpropyl group, a 1,2-dimethylbutyl group, a n-heptyl group, a 1,4-dimethylpentyl group, a 2-methyl-1-isopropylpropyl group, a 1-ethyl-3-methylbutyl group, a cycloheptyl group, a n-octyl group, a 2-ethylhexyl group, a nonyl group, a decyl group, a undecyl group, and a dodecyl group.

From the viewpoint of easy obtainability of a raw material, a is preferably an integer of from 1 to 4, more preferably an integer of from 1 to 3, even more preferably an integer of 2 or 3, and particularly preferably 3.

b is preferably an integer of from 1 to 4, more preferably an integer of from 1 to 3, even more preferably an integer of 2 or 3, and particularly preferably 3.

c is preferably 2 or 3, and more preferably 2.

Furthermore, preferred examples of the $[P(Rf)_aF_{6-a}]^-$ include $[(CF_3CF_2)_3PF_3]^-$, $[(CF_3CF_2CF_2)_2PF_4]^-$, $[(CF_3CF_2CF_2)_3PF_3]^-$, $[(CF_3CF_2CF_2CF_2)_2PF_4]^-$ and $[(CF_3CF_2CF_2CF_2)_3PF_3]^-$. Among them, $[(CF_3CF_2)_3PF_3]^-$ or $[(CF_3CF_2CF_2)_3PF_3]^-$ is more preferable, and $[(CF_3CF_2)_3PF_3]^-$ is even more preferable from the viewpoint of easy obtainability of a raw material.

Furthermore, from the viewpoint of easy obtainability of a raw material, the component (B) of the present invention is preferably a salt which has a cation selected from the group consisting of an aryliodonium cation, an aryl sulfonium cation, and an aryldiazonium cation, and it is more preferably a salt having an aryl sulfonium cation.

The aryliodonium cation is a cation which is represented by the following General Formula (1).

[Chemical Formula 1]

$$R_1-I^+-R_2 \qquad \text{General Formula (1)}$$

In General Formula (1), $R_1$ and $R_2$ are an aryl group having 6 to 30 carbon atoms which may be optionally substituted or a heteroaryl group having 1 to 20 carbon atoms which may be optionally substituted. $R_1$ and $R_2$ may be either the same substituent group or a different substituent group.

Examples of the aryl group having 6 to 30 carbon atoms include, although not particularly limited, a non-fused hydrocarbon group such as a phenyl group, a biphenyl group, or a terphenyl group; and a fused polycyclic hydrocarbon group such as a pentarenyl group, an indenyl group, a naphtyl group, an azulenyl group, a heptarenyl group, a biphenylenyl group, a fluorenyl group, an acenaphthylenyl group, an pleiadenyl group, an acenaphthenyl group, a phenalenyl group, a phenanthryl group, an anthryl group, a fluororanthenyl group, an acephenantrylenyl group, an aceanthrylenyl group, a triphenylenyl group, a pyrenyl group, a chrysenyl group, or a naphthacenyl group. Among them, a substituted or non-substituted phenyl group is preferable.

Examples of the heteroaryl group having 1 to 20 carbon atoms include, although not particularly limited, a pyridyl group, a pyrimidyl group, apyrazinyl group, a triazinyl group, a furanyl group, a pyrrolyl group, a thiophenyl group (thienyl group), a quinolyl group, a furyl group, a piperidyl group, a coumarinyl group, a silafluorenyl group, a benzofuranyl group, a benzimidazolyl group, a benzoxazolyl group, a benzothiazolyl group, a dibenzofuranyl group, a benzothiophenyl group, a dibenzothiophenyl group, an indolyl group, a carbazolyl group, a pyrazolyl group, an imidazolyl group, an oxazolyl group, an isooxazolyl group, a thiazolyl group, an indazolyl group, a pyridazinyl group, a cinnolyl group, a quinazolyl group, a quinoxalyl group, a phthalazinyl group, a phrthalazinedionyl group, a phthalamidyl group, a cromonyl group, a naphtholactamyl group, a quinolonyl group, a naphtharidinyl group, a benzimidazolonyl group, a benzoxazolonyl group, a benzothiazolonyl group, a benzothiazothionyl group, a quinazolonyl group, a quinoxalonyl group, a phthalazonyl group, a dioxopyrimidinyl group, a pyridonyl group, an isoquinolonyl group, an isoquinolinyl group, an isothiazolyl group, a benzisooxazolyl group, a benzisothiazolyl group, an indazilonyl group, an acridinyl group, an acridonyl group, a quinazolinedionyl group, a quinoxalinedionyl group, a benzoxazine dionyl group, a benzoxadinonyl group, a naphthalimidyl group, a dithienocyclopentadienyl group, a dithienosilacyclopentadienyl group, a dithienopyrrolyl group, and a benzodithiophenyl group. Among them, a substituted or non-substituted thiophenyl group is preferable.

Specific examples of the aryliodonium cation include a diphenyliodonium cation.

The aryl sulfonium cation is a cation which is represented by the following General Formula (2).

[Chemical Formula 2]

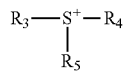

General Formula (2)

In General Formula (2), $R_3$, $R_4$ and $R_5$ are an aryl group having 6 to 30 carbon atoms which may be optionally substituted or a heteroaryl group having 1 to 20 carbon atoms which may be optionally substituted. $R_3$, $R_4$ and $R_5$ may be either the same substituent group or a different substituent group. The aryl group or the heteroaryl group is the same as those exemplified above as an aryliodonium cation. In particular, a substituted or non-substituted phenyl group is preferable as an aryl group, and a substituted or non-substituted thiophenyl group is preferable as a heteroaryl group.

In the above General Formula (2), at least one of $R_3$, $R_4$ and $R_5$ is preferably a substituted heteroaryl group, more preferably a substituted thiophenyl group, and even more preferably a thiophenyl group substituted with phenyl group. Other remaining groups of $R_3$, $R_4$ and $R_5$ are preferably a phenyl group.

Specific examples of the aryl sulfonium cation include a 4-phenylthiophenyldiphenyl sulfonium cation, a triphenyl sulfonium cation, and a tri-p-tolyl sulfonium cation. Among them, a 4-phenylthiophenyldiphenyl sulfonium cation is preferable.

The aryldiazonium cation is a cation which is represented by the following General Formula (3).

[Chemical Formula 3]

General Formula (3)

In General Formula (3), $R_6$ is an aryl group having 6 to 30 carbon atoms which may be optionally substituted or a heteroaryl group having 1 to 20 carbon atoms which may be optionally substituted. The aryl group or the heteroaryl group is the same as those exemplified above as an aryliodonium cation. In particular, a substituted or non-substituted phenyl group is preferable as an aryl group, and a substituted or non-substituted thiophenyl group is preferable as a heteroaryl group.

Specific examples of the aryldiazonium cation include a benzene diazonium cation.

Furthermore, regarding $R_1$ to $R_6$ above, examples of the substituent group which is present depending on case include, although not particularly limited, a substituted or non-substituted alkyl group, a cycloalkyl group, an alkenyl group, an alkynyl group, an aryl group, a heteroaryl group, an acyl group, an alkoxycarbonyl group, an amino group, an alkoxy group, a cycloalkyloxy group, an aryloxy group, an aryloxycarbonyl group, an acyloxy group, an acylamino group, an alkoxycarbonylamino group, an aryloxycarbonylamino group, a sulfonylamino group, a sulfamoyl group, a carbamoyl group, analkylthio group, anarylthiogroup, a silyl group, a sulfonyl group, a sulfinyl group, a ureido group, a phosphoric acid amino group, a halogen atom, a hydroxy group, a mercapto group, a cyano group, a sulfo group, a carboxy group, a nitro group, a hydroxamic acid group, a sulfino group, a hydrazino group, and an imino group. Furthermore, with regard to the above, there is no case in which substitution is made with the same substituent group. Namely, in no case a substituted alkyl is substituted with an alkyl group.

The salt having an anion represented by $[P(Rf)_a F_{6-a}]^-$, which is used as the component (B) of the present invention, is preferably a salt selected from the group consisting of triphenyl sulfonium-tris(perfluoroethyl)trifluorophosphate salt, triphenyl sulfonium-tris(perfluoropropyl)trifluorophosphate salt, tri-p-tolyl sulfonium-tris(perfluoroethyl)trifluorophosphate salt, tri-p-tolyl sulfonium-tris(perfluoropropyl) trifluorophosphate salt, 4-phenylthiophenyldiphenyl sulfonium-tris(perfluoroethyl)trifluorophosphate salt, and 4-phenylthiophenyldiphenyl sulfonium-tris(perfluoropropyl)trifluorophosphate salt, for example, although it is not particularly limited thereto. Further examples thereof include the compounds that are disclosed in WO 2005/116038 A. They may be used either singly or as a mixture of two or more kinds thereof.

Examples of the salt having an anion represented by $[Sb(Rf)_b F_{6-b}]^-$, which is used as the component (B) of the present invention, include triphenyl sulfonium-tris(perfluoroethyl)trifluoroantimony acid salt, triphenyl sulfonium-tris (perfluoropropyl)trifluoroantimony acid salt, tri-p-tolyl sulfonium-tris(perfluoroethyl)trifluoroantimony acid salt, tri-p-tolyl sulfonium-tris(perfluoropropyl)trifluoroantimony acid salt, 4-phenylthiophenyldiphenyl sulfonium-tris(perfluoroethyl)trifluoroantimony acid salt, and 4-phenylthiophenyldiphenyl sulfonium-tris(perfluoropropyl)trifluoroantimony acid salt, although it is not particularly limited thereto. They may be used either singly or as a mixture of two or more kinds thereof.

Examples of the salt having an anion represented by $[B(Rf)_c F_{4-c}]^-$, which is used as the component (B) of the present invention, include triphenyl sulfonium-bis(perfluoroethyl)difluoroborate salt, triphenyl sulfonium-bis(perfluoropropyl)difluoroborate salt, tri-p-tolyl sulfonium-bis(perfluoroethyl)difluoroborate salt, and tri-p-tolyl sulfonium-bis (perfluoropropyl)difluoroborate salt, although it is not particularly limited thereto. They may be used either singly or as a mixture of two or more kinds thereof.

As for the component (B) of the present invention, any one of a commercially available product and a representative synthetic product may be used. In the case of a synthetic product, a metathesis reaction can be mentioned as a synthetic method. Specific examples thereof include those disclosed in WO 2005/116038 A or the like, and it is not limited to them.

The blending amount of the component (B) is, relative to 100 parts by mass of the component (C) which will be described later, preferably in the range of 0.1 to 20 parts by mass, more preferably 0.3 to 10 parts by mass, even more preferably 1 to 5 parts by mass, and particularly preferably 2 to 3 parts by mass. As the component (B) is 0.1 part by mass or more, the effect of having color exhibition of a leuco dye is high and the concealing property of a cured product is favorable. Furthermore, as the component (B) is 20 parts by mass or less, the heat resistance of a cured product is favorable. Furthermore, the blending amount of the component (B) is, relative to 1 part by mass of the component (A), preferably in the range of 0.1 to 20 parts by mass, more preferably 0.5 to 10 parts by mass, even more preferably 1 to 5 parts by mass, and particularly preferably 2 to 3 parts by mass.

<Component (C)>

The radical polymerizable compound as the component (C) of the present invention is a compound having radical polymerizable functional group, which is commonly used for adhesives, paints, or the like. The component (C) is preferably a compound which contains any one of a (meth) acryloyl group, a vinyl group, and a propenyl group. In particular, a compound containing a (meth)acryloyl group is more preferable from the viewpoint of the reactivity. Herein, the (meth)acryloyl group indicates a methacryloyl group and/or an acryloyl group. As for the component (C), any one of a monofunctional compound, a bifunctional compound, a trifunctional compound, and a polyfunctional compound may be used. Furthermore, the component (C) may be at least any one of a monomer and an oligomer. They may be used either singly or as a mixture of two or more kinds thereof. In particular, from the viewpoint of having excellent photocurability and physical property of a cured product, it is preferable to use a monomer and an oligomer in combination. Namely, a preferred aspect of the present invention relates to a photocurable composition in which the component (C) contains an oligomer and a monomer.

Examples of the monofunctional monomer which can be used as the component (C) include, although not particularly limited, ethyl (meth)acrylate, n-butyl (meth)acrylate, tert-butyl (meth)acrylate, isobutyl methacrylate, 2-ethylhexyl (meth)acrylate, isodecyl (meth)acrylate, butoxydiethylene glycol (meth)acrylate, methoxypolyethylene glycol (meth) acrylate, glycidyl (meth)acrylate, lauryl (meth)acrylate, stearyl (meth)acrylate, tetrahydrofurfuryl (meth)acrylate, caprolactone-modified tetrahydrofurfuryl (meth)acrylate, cyclohexyl (meth)acrylate, dicyclopentanyl (meth)acrylate, dicyclopentenyl (meth)acrylate, dicyclopentenyloxy (meth) acrylate, isobornyl (meth)acrylate, adamantyl (meth)acrylate, benzyl (meth)acrylate, phenyl (meth)acrylate, phenoxyethyl (meth)acrylate, phenoxydiethylene glycol (meth) acrylate, phenoxytetraethylene glycol (meth)acrylate, nonylphenoxyethyl (meth)acrylate, butoxyethyl (meth)acrylate, 2-hydroxyethyl (meth)acrylate, 2-hydroxypropyl (meth)acrylate, 4-hydroxybutyl (meth)acrylate, glycerol (meth)acrylate, trifluoroethyl (meth)acrylate, methacryloxyethyl acid phosphate, 2-hydroxyethyl methacrylic acid phosphate, g-methacryloxypropyltrimethoxysilane, g-acryloxypropyltrimethoxysilane, acryloylmorpholine, morpholinoethyl(meth)acrylate, dimethylaminoethyl(meth) acrylate, diethylaminoethyl(meth)acrylate, N,N-dimethylaminoethyl(meth)acrylate, N,N-dimethylaminopropyl (meth)acrylate, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, methacryloxyoctyltrimethoxysilane, vinyltrimethoxysilane, vinyltrichlorosilane, vinyltriethoxysilane, and vinyl-tris(b-methoxyethoxy) silane can be mentioned. From the viewpoint of the compatibility of the component (A) and component (B) of the present invention, and of being excellent in the curability, cyclohexyl (meth)acrylate, dicyclopentanyl (meth)acrylate, dicyclopentenyl (meth)acrylate, dicyclopentenyloxy (meth)acrylate, isobornyl (meth)acrylate, adamantyl (meth) acrylate, benzyl (meth)acrylate, phenyl (meth)acrylate, phenoxyethyl (meth)acrylate, 2-hydroxyethyl (meth)acrylate, 2-hydroxypropyl (meth)acrylate, 4-hydroxybutyl (meth) acrylate, acryloylmorpholine, morpholinoethyl(meth)acrylate, dimethylaminoethyl(meth)acrylate, diethylaminoethyl (meth)acrylate, N,N-dimethylaminoethyl(meth)acrylate, and N, N-dimethylaminopropyl (meth)acrylate are preferable. Among them, from the viewpoint of having an excellent reactivity, isobornyl(meth)acrylate is more preferable. They may be used either singly or in combination of two or more kinds thereof.

Examples of the bifunctional monomer which can be used as the component (C) include, although not particularly limited, ethylene glycol di(meth)acrylate, diethylene glycol di(meth)acrylate, triethylene glycol di(meth)acrylate, tetraethylene glycol dimethacrylate, 1,6-hexanediol di(meth) acrylate, 1,9-nonanediol di(meth)acrylate, glycerin di(meth) acrylate, neopentyl glycol di(meth)acrylate, stearic acid-modified pentaerythritol di(meth)acrylate, dicyclopentenyl diacrylate, di(meth)acryloyl isocyanurate, and alkylene oxide-modified bisphenol di(meth)acrylate. They may be used either singly or in combination of two or more kinds thereof.

Examples of the trifunctional monomer which can be used as the component (C) include, although not particularly limited, trimethylolpropane tri(meth)acrylate, pentaerythritol tri(meth)acrylate, and tris(acryloyloxyethyl) isocyanurate. They may be used either singly or in combination of two or more kinds thereof.

Examples of the polyfunctional monomer which can be used as the component (C) include, although not particularly limited, ditrimethylol propane tetra(meth)acrylate, pentaerythritol tetra(meth)acrylate, dipentaerythritol monohydroxy penta(meth)acrylate, alkyl-modified dipentaerythritol pentaacrylate, and dipentaerythritol hexa(meth)acrylate. They may be used either singly or in combination of two or more kinds thereof.

As for the oligomer which is used for the component (C), any one of a monofunctional oligomer, a bifunctional oligomer, a trifunctional oligomer, and a polyfunctional oligomer may be used. However, from the viewpoint of easy obtainability of a raw material, it is preferable to use a bifunctional oligomer. The weight average molecular weight (Mw) of the oligomer is preferably 1,000 to 100,000, and the viscosity is preferably 10 to 1,000,000 mPa s (60 C). Herein, the weight average molecular weight (Mw) is a value which is measured by using gel permeation chromatography (GPC). Examples of the oligomer include, although not particularly limited, urethane (meth)acrylate having a polybutadiene skeleton, urethane (meth)acrylate having a hydrogenated polybutadiene skeleton, urethane (meth)acrylate having a polycarbonate skeleton, urethane (meth)acrylate having a polyether skeleton, urethane (meth)acrylate having a polyester skeleton, urethane (meth)acrylate having a castor oil skeleton, isoprene-based (meth)acrylate, hydrogenated isoprene-based (meth)acrylate, epoxy (meth)acrylate, and (meth)acrylic group-containing acrylic polymer (meth) acrylic group-containing polyisobutylene. In particular, from the viewpoint of the reactivity, it is preferable to use urethane (meth)acrylate having a polyester skeleton. They may be used either singly or in combination of two or more kinds thereof.

As for the oligomer, anyone of a commercially available product and a synthetic product may be used. Examples of the commercially available product include UV-3000B, UV-3200B, UV-6640B, UV-6100B, and UV-3700B manufactured by The Nippon Synthetic Chemical Industry Co., Ltd., Light (meth)acrylate 3EG-A, 4EG-A, 9EG-A, 14EG-A, PTMGA-250, BP-4EA, BP-4PA, and BP-10EA manufactured by KYOEISHA CHEMICAL CO., LTD., and EBECRYL3700 manufactured by Daicel-Cytec Co., Ltd., but not particularly limited thereto.

When the above monomer and oligomer are used in combination as the component (C), the mass ratio thereof is preferably 30:70 to 95:5, more preferably 40:60 to 90:10, even more preferably 50:50 to 80:20, and particularly preferably 65:35 to 75:25. As the mass ratio between the monomer and the oligomer is within the aforementioned range, excellent photocurability can be obtained.

The photoradical initiator that is a component (D) used in the present invention is not limited as long as being a compound generating radicals by the irradiation with active energy rays. Further, from the viewpoint of capable of achieving both of concealing property and photocurability, a photoradical polymerization initiator having an absorption at a wavelength of 400 nm or more is preferred. In addition, examples of the component (D) include an acetophenone-based photoradical polymerization initiator, a benzoin-based photoradical polymerization initiator, a benzophenone-based photoradical polymerization initiator, a thioxanthone-based photoradical polymerization initiator, an acylphosphine oxide-based photoradical polymerization initiator, and a titanocene-based photoradical polymerization initiator. Among them, from the viewpoint of having excellent concealing property of a cured product, an acetophenone-based photoradical polymerization initiator, an acylphosphine oxide-based photoradical polymerization initiator are preferable. They may be used alone or in combination of two or more kinds thereof. Namely, one embodiment of the present invention relates to a photocurable composition in which the component (D) is an acetophenone-based photoradical polymerization initiator or an acylphosphine oxide-based photoradical polymerization initiator.

Examples of the acetophenone-based photoradical polymerization initiator include, although not particularly limited, diethoxy acetophenone, 2-hydroxy-2-methyl-1-phenylpropane-1-one, benzyl dimethyl ketal, 4-(2-hydroxyethoxy) phenyl-(2-hydroxy-2-propyl)ketone, 1-hydroxy-cyclohexyl-phenyl-ketone, 2-methyl-2-morpholino(4-thiomethylphenyl)propane-1-one, 2-benzyl-2-dimethylamino-1-(4-morpholinophenyl)butanone, and 2-hydroxy-2-methyl-1-[4-(1-methylvinyl) phenyl]propanone oligomer, but are not limited to these ones. Examples of the product available on the market of the acetophenone-based photoradical polymerization initiator includeSpeedcure (registered trademark, the same shall apply hereinafter) 84, Speedcure 73 (manufactured by LAMBSON), IRGACURE (registered trademark, the same shall apply hereinafter) 184, DAROCUR (registered trademark, the same shall apply hereinafter) 1173, IRGACURE 2959, IRGACURE 127 (manufactured by BASF), and ESACURE (registered trademark, the same shall apply hereinafter) KIP-150 (manufactured by Lamberti s.p.a.).

Examples of the acylphosphine oxide-based photoradical polymerization initiator include, although not particularly limited, bis(2,4,6-trimethylbenzoyl)-phenyl-phosphine oxide, and 2,4,6-trimethylbenzoyl-diphenyl-phosphine oxide, but are not limited to these ones. Examples of the product available on the market of the acylphosphine oxide-based photoradical polymerization initiator include Speedcure TPO (manufactured by LAMBSON), LUCIRIN (registered trademark, the same shall apply hereinafter) TPO, IRGACURE 819, and IRGACURE819DW (manufactured by BASF).

The mixing amount of the component (D) of the present invention is, based on 100 parts by mass of the component (C), preferably 0.1 to 15 parts by mass, more preferably 0.5 to 10 parts by mass, and particularly preferably 1 to 5 parts by mass. When the mixing amount of the component (D) is 0.1 part by mass or more, the composition has an excellent photocurability with active energy rays, and when the mixing amount of the component (D) is 15 parts by mass or less, the photocurable composition has an excellent storage stability.

<Other Components>

With regard to the present invention, additives including a tertiary amine compound, various elastomers such as styrene-based copolymer, a polythiol compound, a sensitizing agent, a filler, a conductive filler, a storage stabilizer, an anti-oxidizing agent, a photostabilizer, a storage stabilizer, a heavy metal inactivating agent, a silane coupling agent, a tackifying agent, a plasticizer, an anti-foaming agent, a pigment, an anti-corrosive agent, a leveling agent, a dispersing agent, a rheology adjusting agent, a flame retardant, and a surfactant may be used within a range in which the purpose of the present invention is not impaired.

Examples of the tertiary amine compound include, although not particularly limited, N-phenyl diethanolamine, N-methyl diethanolamine, p-methylphenyl diethanolamine, N-ethyl diethanolamine, N-propyl diethanolamine, N-butyl diethanolamine, triethanolamine, tributanolamine, triisopropanolamine, N-methyl diethanolamine, and N-methyl dimethanolamine; trimethylamine, triethylamine, tributylamine, N,N'-diethanolamine, N,N'-dimethyl-p-toluidine, N,N'-dimethyl-aniline, N-methyl-diethanolamine, N-methyl-dimethanolamine, N,N'-(dimethylamino)ethyl-methacrylate, N,N'-dimethylamino-acetophenone, N,N'-dimethylamino benzophenone, N,N'-diethylamino benzophenone, N-methylpiperidine, N-ethylpiperidine, dimethylbenzylamine, and N,N-dimethylcyclohexylamine. These can be used singly or by mixing two or more kinds thereof. Among them, N-phenyl diethanolamine, N-methyl diethanolamine, p-methylphenyl diethanolamine, N-ethyl diethanolamine, N-propyl diethanolamine, N-butyl diethanolamine, triethanolamine, tributanolamine, and triisopropylamine are preferable.

The mixing amount of the tertiary amine compound is, based on 100 parts by mass of the component (C), preferably 0.01 to 200 parts by mass, more preferably 0.05 to 150 parts by mass, and particularly preferably 0.1 to 100 parts by mass. When the mixing amount of the component (E) is 0.1 part by mass or more, the composition can have an excellent photocurability with active energy rays, and when the mixing amount of the component (E) is 200 parts by mass, the cured product can have excellent concealing property.

Into the present invention, a polythiol compound may be added for the purpose of improving the photocurability. Examples of the polythiol compound include, although not particularly limited, trimethylolpropane tris(3-mercaptopropionate), pentaerythritol tetrakis(3-mercaptopropionate), trimethylolpropane tris(3-mercaptobutyrate), trimethylolethane tris(3-mercaptobutyrate), trimethylolethane tris(3-mercaptobutyrate), ethylene glycol bis(3-mercaptoglycolate), butanediol bis(3-mercaptoglycolate), trimethylol propane tris(3-mercaptoglycolate), pentaerythritol tetrakis(3-mercaptoglycolate), tris-[(3-mercaptopropionyloxy)-ethyl]-isocyanurate, pentaerythritol tetrakis(3-mercaptopropionate), tetraethylene glycol bis(3-mercaptopropionate), dipentaerythritol hexakis(3-mercaptopropionate), pentaerythritol tetrakis(3-mercaptobutyrate), 1,4-bis(3-mercaptobutyryloxy)butane, and 1,3,5-tris(3-mercaptobutyryloxyethyl)-1,3,5-triazine-2,4,6(1H,3H,5H)-trione.

Into the present invention, a sensitizer may be added for the purpose of improving the photocurability. Examples of the sensitizer include anthracene, pyrene, perylene, xanthone, thioxanthone, eosin, ketocoumarin, coumarin, and isobenzofuran.

Into the present invention, for the purpose of improving the elastic modulus, the flowability, and the like of the cured product, a filling material in an amount not impairing storage stability may be added. Specific examples of the filling material include organic powder and inorganic powder.

Examples of the filling material of inorganic powder include, although not particularly limited, glass, fumed silica, alumina, mica, ceramics, silicone rubber powder, calcium carbonate, aluminum nitride, carbon powder, kaolin clay, dry clay mineral, and dry diatomaceous earth. The mixing amount of the inorganic powder is, based on 100 parts by mass of the component (C), preferably 0.1 to 100 parts by mass.

The fumed silica can be mixed for the purpose of adjusting the viscosity of the photocurable composition or improving the mechanical strength of the curedproduct. The fumed silica that has been surface-treated preferably with dimethylsilane, trimethylsilane, alkylsilane, methacryloxysilane, organochlorosilane, polydimethylsiloxane, hexamethyldisilazane, or the like is used. Examples of the product available on the market of the fumed silica include AEROSIL (registered trademark) R972, R972V, R972CF, R974, R976, R976S, R9200, RX50, NAX50, NX90, RX200, RX300, R812, R812S, R8200, RY50, NY50, RY200S, RY200, RY300, R104, R106, R202, R805, R816, T805, R711, RM50, and R7200 (manufactured by NIPPON AEROSIL CO., LTD.).

Examples of the filling material of organic powder include, although not particularly limited, polyethylene, polypropylene, nylon, crosslinked acryl, crosslinked polystyrene, polyester, polyvinyl alcohol, polyvinyl butyral, and polycarbonate. The mixing amount of the organic powder is, based on 100 parts by mass of the component (A), preferably 0.1 to 100 parts by mass.

Examples of the conductive filler include, although not particularly limited thereto, gold, silver, platinum, nickel, palladium, and coated particles having metal thin film coated on an organic polymer particle.

As the storage stabilizer, a radical absorbent such as benzoquinone, hydroquinone, and hydroquinone monomethyl ether, ethylenediamine tetraacetic acid or the 2-sodium salt thereof, a metal chelating agent such as oxalic acid, acetylacetone, and o-aminophenol, or the like can be added.

Examples of the antioxidant include a quinone-based compound such as b-naphthoquinone, 2-methoxy-1,4-naphthoquinone, methylhydroquinone, hydroquinone, hydroquinone monomethyl ether, mono-tert-butylhydroquinone, 2,5-di-tert-butylhydroquinone, p-benzoquinone, 2,5-diphenyl-p-benzoquinone, and 2,5-di-tert-butyl-p-benzoquinone; a phenol-based compound such as phenothiazine, 2,2-methylene-bis(4-methyl-6-tert-butylphenol), catechol, tert-butyl-catechol, 2-butyl-4-hydroxyanisole, 2,6-di-tert-butyl-p-cresol, 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 4,4'-butylidene bis(6-tert-butyl-3-methylphenol), 4,4'-thio bis(6-tert-butyl-3-methylphenol), 3,9-bis[2-[3-(3-tert-butyl-4-hydroxy-5-methylphenyl)prop ionyloxy]-1,1-dimethylethyl]-2,4,8,10-tetraoxaspiro[5,5] undecane, pentaerythritol tetrakis[3-(3,5-di-tert-butyl-4-hydroxyphenyl) propionate], thiodiethylene bis[3-(3,5-di-tert-butyl-4-hydroxyphenyl)propionate], octadecyl-3-(3,5-di-tert-butyl-4-hydroxyphenyl)propionate, N,N'-hexane-1,6-diyl bis[3-(3,5-di-tert-butyl-4-hydroxyphenyl)propionamide], benzenepropanoic acid, 3,5-bis(1,1-dimethylethyl)-4-hydroxy, C7 to C9 side-chain alkyl ester, 2,4-dimethyl-6-(1-methylpentadecyl)phenol, diethyl[[3,5-bis(1,1-dimethylethyl)-4-hydroxyphenyl]methyl]phosphonate, 3,3',3",5,5',5"-hexa-tert-butyl-a,a',a"-(mesitylene-2,4,6-tolyl)tri-p-cresol, calcium diethyl bis[[3,5-bis(1,1-dimethylethyl)-4-hydroxyphenyl]methyl]phosphonate, 4,6-bis(octylthiomethyl)-o-cresol, ethylene bis(oxyethylene)bis[3-(5-tert-butyl-4-hydroxy-m-tolyl)propionate], hexamethylene bis[3-(3,5-di-tert-butyl-4-hydroxyphenyl) propionate, 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylyl)methyl]-1,3,5-triazine-2,4,6(1H, 3H,5H)-trione, a reaction product of N-phenylbenzenamine and 2,4,6-trimethylpentene, 2,6-di-tert-butyl-4-(4,6-bis(octylthio)-1,3,5-triazine-2-ylamino)phenol, picric acid, and citric acid; a phosphorus-based compound such as tris(2,4-di-tert-butylphenyl)phosphite, tris[2-[[2,4,8,10-tetra-tert-butyldibenzo[d,f][1,3,2]dioxaphosphephine-6-yl]oxy]ethyl] amine, bis(2,4-di-tert-butylphenyl)pentaerythritol diphosphite, bis[2,4-bis(1,1-dimethylethyl)-6-methylphenyl]ethyl ester phosphorous acid, tetrakis(2,4-di-tert-butylphenyl) [1,1-bisphenyl]-4,4'-di ylbisphosphonite, and 6-[3-(3-tert-butyl-4-hydroxy-5-methylphenyl)propoxy]-2,4,8,10-tetra-tert-butyldibenz[d,f][1,3,2]dioxaphosphephine; a sulfur-based compound such as dilauryl 3,3'-thiodipropionate, dimyristyl 3,3'-thiodipropionate, distearyl 3,3'-thiodipropionate, pentaerythrityl tetrakis(3-laurylthiopropionate), and 2-mercaptobenzimidazole; an amine-based compound such as phenothiazine; a lactone-based compound; and a vitamin E-based compound. Among them, a phenol-based compound is suitable.

Examples of the silane coupling agent include g-chloropropyl trimethoxysilane, octenyltrimethoxysilane, glycidoxyoctyltrimethoxysilane, b-(3,4-epoxycyclohexyl)ethyltrimethoxysilane, g-glycidoxypropyltrimethoxysilane, g-mercaptopropyltrimethoxysilane, g-aminopropyl triethoxysilane, N-b-(aminoethyl)-g-aminopropyl trimethoxysilane, N-b-(aminoethyl)-g-aminopropylmethyl dimethoxysilane, g-ureidopropyltriethoxysilane, and p-styryltrimethoxysilane. The mixing amount of the silane coupling agent is, based on 100 parts by mass of the component (C), preferably 0.05 to 30 parts by mass, and more preferably 0.2 to 10 parts by mass.

The photocurable composition of the present invention can be produced by a known method. For example, the photocurable resin composition can be produced by blending components (A) to (D) each in a predetermined amount, and by mixing the resultant mixture at a temperature of preferably 10 to 70 C, more preferably 20 to 40 C, for preferably 0.1 to 5 hours using a mixing measure such as a mixer.

By irradiating the photocurable composition of the present invention with an active energy ray such as ultraviolet ray or visible right, preferably with ultraviolet ray, a cured product can be obtained. Wavelength of ultraviolet ray is preferably 315 to 400 nm. Examples of the light source include, although not particularly limited, a low-pressure mercury lamp, a medium-pressure mercury lamp, a high-pressure mercury lamp, an ultrahigh-pressure mercury lamp, a black-light lamp, a microwave excited-mercury lamp, a metal halide lamp, a sodium lamp, a halogen lamp, a xenon lamp, an LED, a fluorescent lamp, sunlight, and an electron beam irradiator. The irradiation amount of the light irradiation is, from the viewpoint of the characteristics of the cured product, preferably 10 $kJ/m^2$ or more, more preferably 20 $kJ/m^2$ or more, even more preferably 50 $kJ/m^2$ or more, and particularly preferably 100 $kJ/m^2$ or more. Irradiation intensity for irradiating with active energy ray is preferably 10 to 300 $mW/cm^2$, more preferably 20 to 200 $mW/cm^2$, even more preferably 30 to 150 $mW/cm^2$, and particularly preferably 50 to 100 $mW/cm^2$. Irradiation time for irradiating with active energy ray is preferably 10 seconds to 20 minutes, more preferably 20 seconds to 10 minutes, even more preferably 30 seconds to 300 seconds, and particularly preferably 60 seconds to 120 seconds.

Examples of a use for which the photocurable composition of the present invention is suitably used include a covering agent, a casting resin, a seal agent, a sealing agent, a potting agent, an adhesive, a coating agent, a lining agent, and ink. In particular, from the viewpoint obtaining a cured product having high concealing property and inhibited color fading in a high humidity and high temperature environment by irradiation with an active energy ray such as ultraviolet ray, the photocurable composition of the present invention preferably has a use as a covering agent, a casting resin, a seal agent, a potting agent, an adhesive, and a coating agent. Namely, one embodiment of the present invention relates to a photocurable composition which is used as a covering agent, a casting agent, a seal agent, a potting agent, an adhesive, or a coating agent.

Particularly preferred use of the photocurable composition of the present invention includes a coating material for flexible wiring board, a casting resin, black stripes of a lens, an image display device, an optical member, a CMOS sensor, an adhesive for assembling a case body and lens, and a liquid crystal display seal agent for the purpose of preventing light leakage of back light, preventing penetration of external light, or the like.

EXAMPLES

Hereinafter, the present invention will be further explained in detail by way of Examples, but should not be limited at all by these Examples. Furthermore, in the following examples, the operations were carried out at room temperature (20 to 25 C) unless specifically described otherwise. Furthermore, "%" and "parts" mean "% by mass" and "parts by mass", respectively, unless specifically described otherwise.

Test methods that are used in Examples and Comparative Examples are as described below.

b1: Synthesis of 4-phenylthiophenyldiphenyl sulfonium-tris(perfluoroethyl)trifluorophosphate salt To a reaction vessel, 6.1 parts by mass of diphenyl sulfoxide (manufactured by TOKYO CHEMICAL INDUSTRY CO., LTD.), 4.7 parts by mass of diphenyl sulfide (manufactured by KISHIDA CHEMICAL Co., Ltd.), and 21.5 parts by mass of methane sulfonic acid (manufactured by TOKYO CHEMICAL INDUSTRY CO., LTD.) were added. After mixing, 4.0 parts by mass of acetic anhydride (reagent manufactured by JUNSEI CHEMICAL CO., LTD.) were added dropwise thereto. After the reaction for 6 hours at 50 C, cooling to room temperature was carried out. The resulting reaction solution was added dropwise to a vessel added with 62.3 parts by mass of 20% by mass aqueous solution of potassium tris(pentafluoroethyl)trifluorophosphate followed by mixing for 1 hour at room temperature. The precipitates were extracted with 60 parts by mass of ethyl acetate to separate the aqueous layer. The solvent was removed from the organic layer by distillation, and the obtained residues were dissolved by adding 25 parts by mass of toluene. In order to remove unreacted raw materials and impurities such as by-products, 135 parts by mass of hexane were added to the toluene solution followed by thorough stirring at 10 C for 1 hour, and then the solution was allowed to stand. To separate the solution into 2 layers, the top layer was removed by liquid fractionation. To the remaining bottom layer, 75 parts by mass of hexane were added, followed by thorough stirring at room temperature to have precipitation of crystals. The crystals were filtered and dried under reduced pressure to obtain 12.3 parts by mass of 4-phenylthiophenyldiphenyl sulfonium-tris(perfluoroethyl)trifluorophosphate salt.

<Preparation of Photocurable Composition>

Each component was taken in parts by mass shown in Table 1. According to mixing for 60 minutes at room temperature (25 C) using a planetary mixer, a photocurable composition was prepared. Then, various physical properties were measured as described below. Furthermore, the specific preparation amount was as shown in Table 1, and all the numerical values were expressed in terms of parts by mass.

<Component (A)>
a1: 3-Dibutylamino-6-methyl-7-anilinofluorane (ODB-2, manufactured by Yamamoto Chemicals, Inc.)

<Component (B)>
b1: 4-Phenylthiophenyldiphenyl sulfonium-tris(perfluoroethyl)trifluorophosphate salt <Comparative Component of the Component (B)>
b'1: Diphenyl-4-(phenylthio)phenyl sulfonium-hexafluorophosphate salt (CPI-100P, manufactured by San-Apro Ltd.)

<Component (C)>
c1: Urethane acrylate oligomer (UV-3000B, manufactured by The Nippon Synthetic Chemical Industry Co., Ltd)
c2: Isobornyl acrylate (Light acrylate IBX-A, manufactured by KYOEISHA CHEMICAL CO., LTD.)

<Component (D)>
d1:2-Hydroxy-2-methyl-1-phenyl-propan-1-one (DAROCUR 1173, manufactured by BASF Japan Ltd.). Test methods that are used in Examples and Comparative Examples in Table 1 are as described below.

<Determination of Outer Appearance of Cured Product>

Each photocurable composition was irradiated with ultraviolet ray of 120 kJ/m² (100 mW/cm²·120 seconds) using an LED irradiator (365 nm) to obtain a cured product. Outer appearance of the resulting cured product was determined with naked eyes, and the results are shown in Table 1.

<Color Fading Test of Cured Product (Measurement of Transmittance)>

Each photocurable composition was spread to thickness of 0.2 mm so as to obtain a test specimen with smooth surface. By irradiating it with ultraviolet ray of 120 kJ/m² (100 mW/cm²·120 seconds), a cured product was obtained. In addition, transmittance (550 nm) of the cured product was measured with spectrophotometer UV-2450 (manufactured by Shimadzu Corporation). Furthermore, from the viewpoint of having excellent concealing property of a cured product, the transmittance is preferably less than 10% at dry thickness of 0.2 mm.

<Color Fading Test of Black-Colored Cured Product in High Temperature and High Humidity Environment or in High Temperature Environment (Measurement of Transmittance)>

Each photocurable composition was spread to thickness of 0.2 mm so as to obtain a test specimen with smooth surface. By irradiating it with ultraviolet ray of 120 kJ/m² (100 mW/cm²·120 seconds), a cured product was obtained. Next, to determine any color fading of the cured product in a high temperature and high humidity environment or in a high temperature environment, the cured product was allowed to stand in a high temperature and high humidity (85 C and 85% RH) environment or in a high temperature (100 C) environment for 40 hours. Then, transmittance (550 nm) of the cured product after standing was measured with spectrophotometer UV-2450 (manufactured by Shimadzu Corporation). Furthermore, from the viewpoint of having excellent concealing property of a cured product, the transmittance is preferably less than 10% at dry thickness of 0.2 mm.

TABLE 1

| Component | | Example 1 | Example 2 | Comparative Example 1 | Comparative Example 2 |
| --- | --- | --- | --- | --- | --- |
| Component (A) | a1 | 1 | 1 | 1 | 1 |
| Component (B) | b1 | 3 | 2 | | |
| | b'1 | | | 3 | 2 |
| Component (C) | c1 | 30 | 30 | 30 | 30 |
| | c2 | 70 | 70 | 70 | 70 |
| Component (D) | d1 | 3 | 3 | 3 | 3 |
| Outer appearance of cured product | | Black color | Black color | Black color | Black color |
| Transmittance of cured product | | 0.5% | 0.7% | 0.7% | 0.9% |
| Color fading property after high temperature and high humidity resistance test (85 C. · 85% · 40 h) | | 1.4% | 1.2% | 40% | 37% |
| Color fading property after heat resistance test (100 C. · 40 h) | | 3.0% | 2.0% | 27% | 15% |

According to Table 1, Examples 1 and 2 corresponding to the present invention have a photocurable composition which allows obtainment of a cured product with high concealing property by irradiation with an active energy ray such as ultraviolet ray and has inhibited color fading of the cured product in a high temperature and high humidity (85 C and 85% RH) environment or a high temperature (100 C) environment furthermore.

Furthermore, when Comparative Examples 1 and 2 related to the photocurable composition containing a photoacid generator (diphenyl-4-(phenylthio)phenyl sulfoniumhexafluorophosphate salt), which is not the component (B) of the present invention, are compared with Examples of the present invention, color fading of a cured product caused under high temperature and high humidity or high temperature was shown, and thus they were found to be inferior in terms of inhibition of color fading. In particular, significant color fading of a cured product caused under high temperature and high humidity was shown.

INDUSTRIAL APPLICABILITY

According to the photocurable composition of the present invention, a cured product having high concealing property can be obtained by irradiation with an active energy ray such as ultraviolet ray, and color fading of the cured product in a high temperature and high humidity (85 C and 85% RH) environment or a high temperature (100 C) environment is inhibited, and thus the photocurable composition can be suitably used for various adhesive applications. Specifically, it is very effective as a covering agent, a casting resin, a seal agent, a sealing agent, a potting agent, an adhesive, a coating agent, a lining agent, an adhesive, and ink. As being applicable to a broad field, the photocurable composition of the present invention has an industrial applicability.

Further, the application of the present invention is not limited to the embodiments described above, and appropriate changes may be made in the range where the gist of the present invention is not impaired.

This application is based on Japanese Patent Application No. 2015-9606, filed in Japan on Jan. 21, 2015, and the content of the disclosure is hereby incorporated as its entirety by reference.

The invention claimed is:

1. A photocurable composition comprising the following components (A) to (D):
    component (A): a leuco dye;
    component (B): a salt having an anion selected from the group consisting of $[P(RF)_nF_{6-n}]^-$, $[Sb(Rf)_bF_{6-b}]^-$, and $[B(RF)_cF_{4-c}]^-$, in the formulae, Rf represents a fluoroalkyl group having 1 to 20 carbon atoms, a and b each independently represent an integer of from 1 to 5, and c represents an integer from 1 to 3 and an aryl sulfonium cation selected from the group consisting of a 4-phenylthiophenyldiphenyl sulfonium cation, and a tri-p-tolyl sulfonium cation;
    component (C): a radical polymerizable compound containing a urethane (meth)acrylate compound; and
    component (D): a photoradical initiator.

2. The photocurable composition according to claim 1, wherein
    the component (B) is a salt having an anion represented by $[P(Rf)_aF_{6-a}]^-$ (in the formula, Rf represents a fluoroalkyl group having 1 to 20 carbon atoms and a represents an integer of from 1 to 5).

3. The photocurable composition according to claim 1, wherein
    $[P(Rf)_aF_{6-a}]^-$ of the component (B) is an anion selected from the group consisting of $[(CF_3CF)_3PF_3]^-$, $[(CF_3CF_2CF_2)_2PF_4]^-$, $[(CF_3CF_2CF_2)_3PF_3]^-$, $[(CF_3CF_2CF_2CF_2)_2PF_4]^-$, and $[(CF_3CF_2CF_2CF_2)_3PF_3]^-$.

4. The photocurable composition according to claim 1, wherein
the component (B) is at least one salt selected from the group consisting of triphenyl sulfonium-tris(perfluoroethyl)trifluorophosphate salt, triphenyl sulfonium-tris(perfluoropropyl)trifluorophosphate salt, tri-p-tolyl sulfonium-tris(perfluoroethyl)trifluorophosphate salt, tri-p-tolyl sulfonium-tris(perfluoropropyl)trifluorophosphate salt, 4-phenylthiophenyldiphenyl sulfonium-tris(perfluoroethyl)trifluorophosphate salt, and 4-phenylthiophenyldiphenyl sulfonium-tris(perfluoropropyl)trifluorophosphate salt.

5. The photocurable composition according to claim 1, wherein
the component (B) is contained at 0.1 to 20 parts by mass relative to 100 parts by mass of the component (C).

6. The photocurable composition according to claim 1, wherein
the component (C) contains an oligomer and a monomer, and where the mass ratio of the monomer to the oligomer is 50:50 to 80:20.

7. The photocurable composition according to claim 1, wherein
the component (D) is an acetophenone-based photoradical polymerization initiator or an acylphosphine oxide-based photoradical polymerization initiator.

8. The photocurable composition according to claim 1, wherein
the photocurable composition is used for a covering agent, a casting agent, a seal agent, a potting agent, an adhesive, or a coating agent.

9. The photocurable composition according to claim 1, wherein
said component (D) is included in an amount of 0.1 to 15 parts by mass relative to 100 parts by mass of the component (C).

10. The photocurable composition according to claim 1, wherein the component (A) is included in an amount of 0.01 to 20 parts by mass relative to 100 parts by mass of the component (C).

11. The photocurable composition according to claim 1, wherein said component (C) contains a urethane (meth)acrylate oligomer.

12. The photocurable composition according to claim 1, wherein said component (C) contains a urethane (meth)acrylate oligomer having a polyester skeleton.

13. The photocurable composition according to claim 1, wherein said aryl sulfonium cation consists of 4-phenylthiophenyldiphenyl sulfonium cation.

* * * * *